US012008366B2

(12) United States Patent
Chamarthy et al.

(10) Patent No.: US 12,008,366 B2
(45) Date of Patent: Jun. 11, 2024

(54) CORRELATING USAGE TO ISSUES IN APPLICATION PROGRAMMING INTERFACES

(71) Applicant: International Business Machines Corporation, Armonk, NY (US)

(72) Inventors: Ravi Chandra Chamarthy, Hyderabad (IN); Prateek Goyal, Indore (IN); Manish Anand Bhide, Hyderabad (IN); Madhavi Katari, Telangana (IN)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 17/805,233

(22) Filed: Jun. 3, 2022

(65) Prior Publication Data
US 2023/0393848 A1    Dec. 7, 2023

(51) Int. Cl.
G06F 8/77    (2018.01)
(52) U.S. Cl.
CPC ..................................... G06F 8/77 (2013.01)
(58) Field of Classification Search
None
See application file for complete search history.

(56) References Cited

U.S. PATENT DOCUMENTS

| | | | |
|---|---|---|---|
| 10,956,244 B1 | 3/2021 | Cho | |
| 2015/0128156 A1 | 5/2015 | Zhu | |
| 2015/0220376 A1* | 8/2015 | Srivastava | G06F 11/327 714/37 |
| 2019/0196811 A1 | 6/2019 | Bahrami | |
| 2019/0243692 A1 | 8/2019 | Lincoln | |
| 2020/0327449 A1* | 10/2020 | Tiwari | G06Q 30/0202 |
| 2021/0081260 A1* | 3/2021 | Gilling | G06F 9/541 |
| 2022/0179778 A1* | 6/2022 | Ramanjani | G06N 20/10 |

OTHER PUBLICATIONS

"Best Practices in API Design", Swagger Supperted by SMARTBEAR, © 2021 SmartBear Software, 17 pages, <https://swagger.io/resources/articles/best-practices-in-api-design/>.
"Develop API and strategy for handling stale data #1607", hyperledger-archives, May 26, 2016, 3 pages, <https://github.com/hyperledger-archives/fabric/issues/1607>.
"Why Data-Driven Customer Success is Essential in Today's COVID-19 World", Apr. 30, 2021—API Strategy, 3 pages, <https://www.moesif.com/blog/customer-success/monitoring/Why-Data-Driven-Customer-Success-is-Essential-in-Today-s-COVID-19-World/>.
Harguindeguy, Bernard, "Everything You Need to Know about API Security in 2021", Oct. 7, 2021, API Security: A Complete Guide | Ping Identity, 15 pages, <https://www.pingidentity.com/en/company/blog/posts/2020/everything-need-know-api-security-2020.html>.
Koppenhaver, Keanan, "5 Most Common API Errors and How to Fix Them", Lightrun, Jul. 29, 2021, 10 pages, <https://lightrun.com/debugging/5-most-common-api-errors-and-how-to-fix-them>.

* cited by examiner

*Primary Examiner* — Syed A Roni
(74) *Attorney, Agent, or Firm* — Stephen R. Yoder (57) ABSTRACT

Early indications of application programming interface (API) usage are identified by correlation to particular issues with the API including singular and mutual consistency, completeness, accuracy, and staleness. Analysis of API input and output along with data type and formatting information facilitates identification of the API issues. Establishing a correlation between API usage and issues supports early detection of potential usage reduction on a case-by-case level. Corrective action to resolve identified issues may be performed in a timely manner to maintain usage levels.

20 Claims, 3 Drawing Sheets

CORRELATING USAGE TO ISSUES IN APPLICATION PROGRAMMING INTERFACES

BACKGROUND

The present invention relates generally to the field of application usage, and more particularly to issues with API input/output.

An application programming interface (API) is a set of functions that allows applications to access data and interact with external software components, operating systems, and/or microservices.

The demand for APIs is driving the software engineering industry to the diverse, evolving market of full life cycle API management products. API management is a robust field with clients using API management tools to manage and expose their APIs to partners and their respective users. Some API management tools monitor the API lifecycle across multiple clouds, boost socialization and optimize monetization efforts throughout the business ecosystem. Other API management services operate to unify data to deliver a single view of a particular user, automate business processes, and build connected experiences for the user.

API management tools provide certain analytics options for discovering which users most use which APIs and from which countries are certain APIs being used.

SUMMARY

In one aspect of the present invention, a method, a computer program product, and a system for correlating application programming interface (API) usage to issues in APIs includes: identifying field characteristics of API input/output (I/O) data generated during operation of an API; validating the I/O data based on a set of issue criteria; identifying a set of issues for a first user, the set of issues identified in the set of issue criteria; establishing a degree of correlation of an identified issue to API usage reduction; and responsive to the degree of correlation meeting a threshold degree of correlation, taking a retention action corresponding to the threshold degree.

DETAILED DESCRIPTION

Early indications of application programming interface (API) usage are identified by correlation to particular issues with the API including singular and mutual consistency, completeness, accuracy, and staleness. Analysis of API input and output along with data type and formatting information facilitates identification of the API issues. Establishing a correlation between API usage and issues supports early detection of potential usage reduction on a case-by-case level. Corrective action to resolve identified issues may be performed in a timely manner to maintain usage levels. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
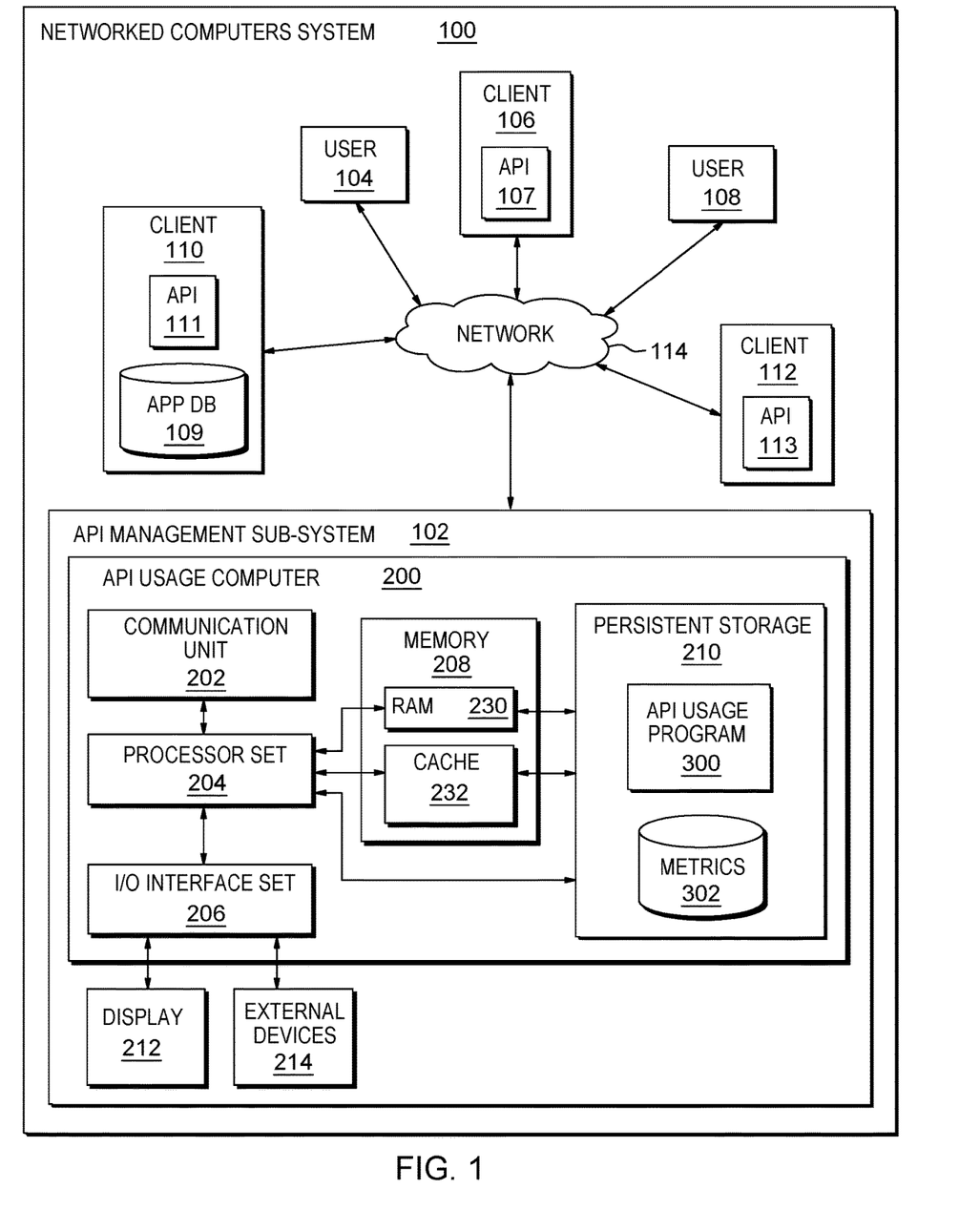
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: application programming interface (API) management sub-system 102; user sub-systems 104, 108; client sub-systems 106, 110, 112; application programming interfaces (APIs) 107, 111, 113; application database 109; communication network 114; API usage computer 200; communication unit 202; processor set 204; input/output (I/O) interface set 206; memory device 208; persistent storage device 210; display device 212; external device set 214; random access memory (RAM) devices 230; cache memory device 232; API usage program 300; and API metrics store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Application programming interface (API) usage program 300 operates to monitor API input/output (I/O) and detect issues in the I/O data that may be correlated to API usage. Issue resolution and usage reduction awareness serve to maintain client-specific API usage levels. Anomalous behavior is detected with reference to data formatting and data types associated with various data fields. User-specific patterns and methods further support identification of API issues that may lead to reduced API usage.

Some embodiments of the present invention recognize the following facts, potential problems and/or potential areas for improvement with respect to the current state of the art: (i) conventional API analytics are directed to who is using particular APIs; (ii) conventional API analytics are directed to identifying from which countries particular APIs are being used; (iii) conventional API analytics tools lack the capability to provide needed API analytics; and/or (iv) API management does not focus on the data processed by the API, but focuses on the API statistics such as how many times was the API unavailable or threw an error.

An example use of API usage is where a manufacturer exposes their API for users to consume. The API may fetch data about the manufacturers products that are available on their website and return the data to the clients. The users of the API may be aggregators or b2b (business-to-business) users who use the API to collect information about the products and then make a purchase. In such an environment, certain issues may occur with the API while fetching the product details. These issues may lead to user dissatisfaction and may be an early indicator of user attrition. Given the importance of APIs for users, there is a need for a technology that will provide early warning to the API provider about user attrition.

Some embodiments of the present invention are directed to two phases in the API metrics computation process. The two phases may be defined as follows: (i) pattern discovery and metrics validation registration; and (ii) metrics computation.

Pattern discovery and metrics validation registration is the first phase for the API metrics computation process. This phase relates to several aspects of the process including: (i) single field consistency; (ii) mutual consistency; (iii) accuracy; (iv) completeness; and (v) staleness. These aspects are described in the following paragraphs.

Single field consistency refers to establishing that each field associated with the API input and output is of a designated data type. Data types include, but are not limited to: (i) first name, (ii) last name, (iii) street name, (iv) address, (v) city, (vi) region, (vii) geographic identifier, (viii) personal identification number, and/or (ix) account number. Each data type has a corresponding format.

Before an API is deployed into production, it is first analyzed in a pre-production environment. In the pre-production environment, a validator engine sends different kinds of data to the model in question. The data sent is representative of the kind of data the model will receive in production according to a pre-defined scope of use. The received data is analyzed to identify metadata for the various fields in the API input/output. In that way, the system determines which filed types are in the API input/output.

In practice, every field will not be assigned a pre-defined data type. In order to complete the task of assigning a unique field type to every field of the API input/output, an administrator may be presented with any unresolved fields to specify the format of the remaining fields. For example, the administrator may specify that the attribute "User ID" is of the format: XXX-YY-DDDDDD, where the X spaces indicate a three-character country code, the Y spaces indicate a two-character region code, and the D spaces indicate a three to six-digit geographic identifier code. According to some embodiments of the present invention, a regular expression may be used for validation. Alternatively, a user is prompted to provide a method for which the validation can be done. The method will accept one or more field values and return a Boolean result.

Regarding the aspect of mutual consistency, the data returned by the API could be individually accurate for each corresponding field, but it may still be inaccurate across fields. An example of mutual consistency is when the User ID code mentioned above starts with the three-character set "USA," the region should be identifiable by a valid zip code of the country identified by "USA." According to some embodiments of the present invention, the user defines a method by which the two individual field values are compared in order to return "true" if the two fields are mutually consistent or "false" if otherwise. Alternatively, users provide pre-defined pattern pairs, such as the User ID with the X spaces "USA" as one part and a valid zip code for the corresponding country in the D spaces as the other part would make up a pattern pair. Predefined pattern pairs support determination of mutual consistency of API input/output when analyzing the API for potential user attrition.

Regarding the aspect of accuracy, the terms in a particular field returned by the API may be evaluated for accuracy with respect to a pre-defined set of terms that may be entered in the field. The API may be returning inaccurate data such as an API that returns information for products that are out of stock because, for example, the API does not have access to the latest product stock information. Such an occurrence could lead to errors when a client tries to book a product order. Another example of inaccurate data is when the API returns a country of origin when the stated country is not valid for a particular product or the country is not on a validated list of countries. For example, if a field is identified as containing the region data type, each value in the field may be required to match one of a pre-defined set of terms. A value that does not match any pre-defined term for the given field indicates that the API response for the field is inaccurate. Alternatively, users are prompted to specify patterns or methods for detecting an inaccurate value in a field of a given data type.

The term completeness, as used herein, refers to when the API returns fields that are empty or null. That is, the API response is returned but the response is determined to be a incomplete response. An incomplete API response could be due to certain fields having null or empty values. According to some embodiments of the present invention, user-specified patterns may be referred to when identifying an empty value for particular fields. Lack of completeness may be exemplified by an API that returns information about the products that should also include consumer reviews. However, for some categories of products, the consumer reviewers are not being returned. This is an example of incomplete data being returned by the API.

The information returned by the API may be stale. For example, the API may return the comments of users for the product. It could happen that the comments being returned are very old and the latest comments are not being returned. This would lead to a poor user experience and impact client business when the users notice that the reviews are not recent. Detecting staleness in the API input/output is based on identifying any the fields of the data type date or timestamp during validation in the pre-production environment.

Metrics computation is the second phase for the API metrics computation process. The metrics computation phase occurs after the API is deployed into production. In the second phase, the API input and output is validated with reference to patterns and/or methods provided by the user. The validation process is described in the following paragraphs for certain aspects of the metrics computation process.

Whenever an API is called, the various field values of the API input/output is sent to the method defined by the user. If the method returns a false, the API call is flagged as being mutually inconsistent. Information on mutual consistency of API calls is stored in a metrics database, such as metrics store 302 (FIG. 1).

Some embodiments of the present invention compare the API input/output of an API call with a pre-defined pattern to establish an accuracy rating of the API. Alternatively, the API input/output is sent to the method defined by the user to determine the accuracy of the API output. Inaccurate API output is stored in the metrics database.

The patterns and/or methods provided by the user are referred to when determining completeness of an API response.

Some embodiments of the present invention apply a two-step process to measure staleness of an API. The first step is to learn the average difference between the current time and the time returned in the API for each tenant or user. This will be done for each attribute or field identified as a time or timestamp data type. For example, a first tenant having a specific interest in adventure sports might make API calls to get the details of the investments related to adventure sports.

Regarding the second step, if one of the fields related to adventure sports is the comment field for each sports equipment type along with a timestamp of each comment, some embodiments of the present invention may compute the average staleness of the comments as a first step, which may be two weeks on average for all tenants, then as a second step, the average staleness of comments by the first tenant may be identified as being two months. When the relative difference between average comment times meets a threshold difference, the API usage of the first tenant will be flagged as a potential staleness issue.

Figure 2:
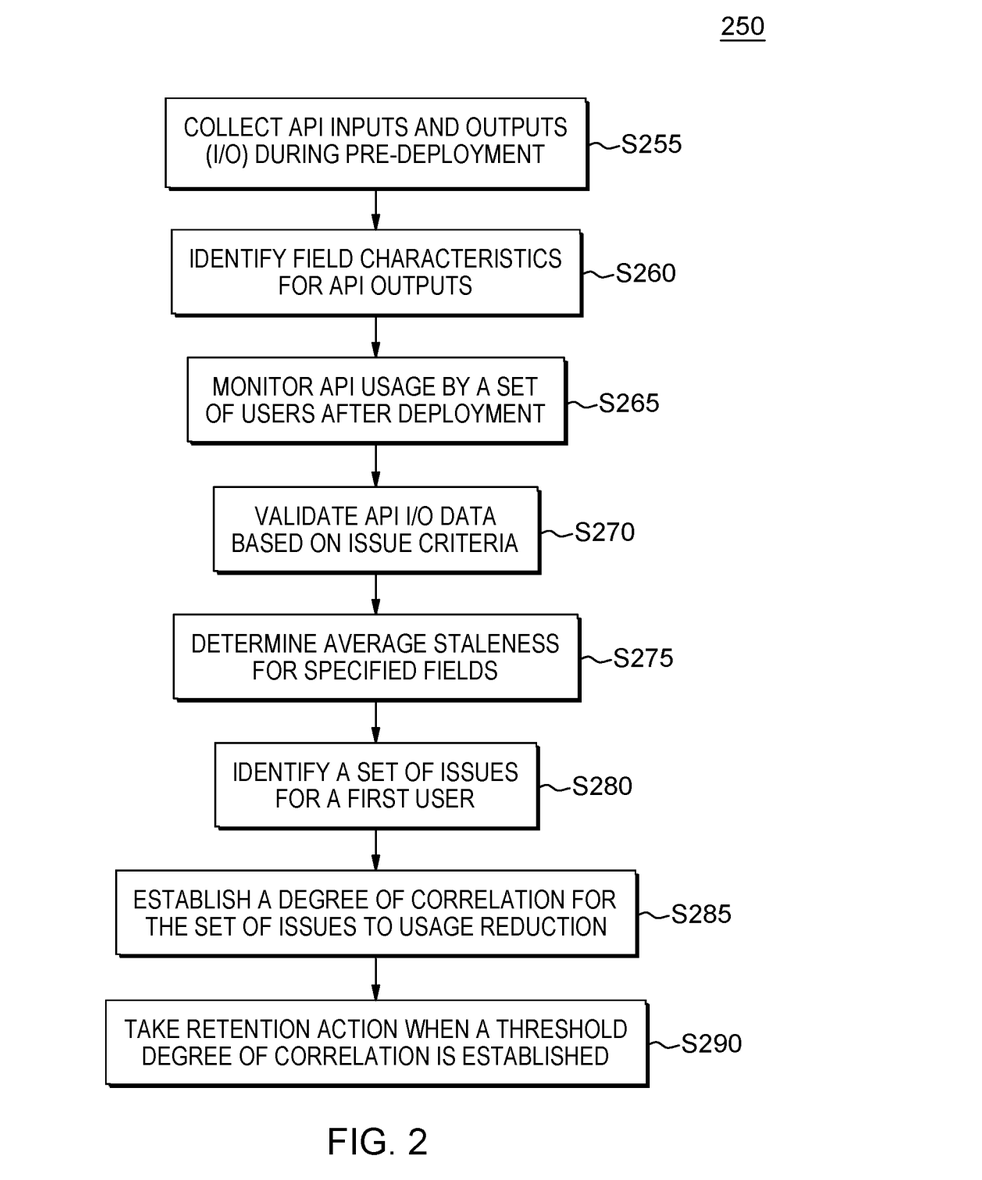
FIG. 2 is a flowchart showing a method performed, at least in part, by the first embodiment system.
Figure 3:
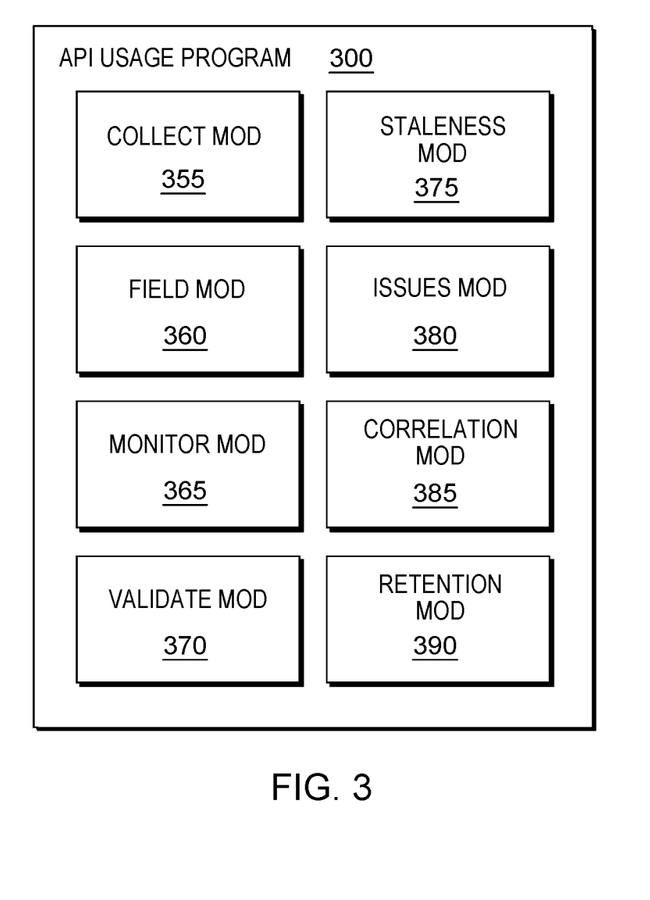
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where collect module ("mod") 355 collects API inputs/outputs (I/O) during a pre-deployment phase. In this example, a pre-deployment, or pre-production, phase is implemented for evaluating the API for usage and user/subscriber attrition. With reference to FIG. 1, API usage computer 200 collects API I/O data generated by interaction between user sub-system 104 and API 111 of client sub-system 110 over network 114. Alternatively, the API is exposed for user consumption and the collect module collects API I/O during production use, or post-deployment. During the pre-deployment phase, various kinds of data that may be received by the API after deployment are modelled for evaluation. Essentially, an API delivers a user response to a system (input) and send the system's response back to the user (output). Fundamental request methods that can be made with an API include: (i) get, which gathers information; (ii) put, which updated pieces of data; (iii) post, which creates new data; and (iv) delete, which deletes data.

The data received and returned by an API may be related to various kinds of data including, but not limited to: (i) names; (ii) street addresses; (iii) geopolitical regions and sub-regions; (iv) identification numbers; (v) account numbers; and/or (vi) application-specific data.

Processing proceeds to step S260, where field mod 360 identifies field characteristics for API outputs. Field characteristics identified in this step may include certain formatting characteristics such as: (i) number of digits; (ii) number of characters; (iii) pattern of digits and characters; (iv) length of data entry components (e.g a client identification number having a three-character country code, two-character state code, and six-digit account number); and/or (v) relationships between fields (city, state, zip code). In this example, field characteristics are stored in metric store 302 (FIG. 1). Some embodiments of the present invention use reference tables having pre-defined field data patterns or cross-reference to pre-defined relationships between fields, such as for a given state, a set of corresponding city codes may be provided. A further example may be a given account number having a set of corresponding usernames.

Processing proceeds to step S265, where monitor mod 365 monitors API usage by a set of users after deployment. The steps above may each be performed during production or "after deployment," but some embodiments of the present invention are directed to developing a record of patterns, fields, and/or field characteristics during a pre-deployment period. The developed record may be the basis for which the monitor mod operates to monitor API usage. In this example, the monitor mod tracks usage by pre-defined users, such as users 104, 108, according to API owners associated with the APIs being monitored, such as client sub-systems 110, 106, 112. Alternatively, for a given API, all usage of the API is monitored, and each user of the API is identifiable such that user-specific usage is recorded.

Processing proceeds to step S270, where validate mod 370 validates API I/O data based on issue criteria. In this example, validation of the API I/O data generated during interactions with API 111 is performed according to recorded field characteristics (FIG. 1). The API I/O data may be stored in metrics store 302. Alternatively, validation may be based on information from recorded patterns and fields developed during pre-deployment. Alternatively, input from an API owner specifies particular issue criteria on which the API I/O data is validated.

Issue criteria may include one or more of the following: (i) singular field consistency; (ii) mutual field consistency; (iii) data accuracy; (iv) data completeness; (v) field completeness; and (vi) data staleness. Issue criteria are established for correlation to potential user or subscriber attrition. According to some embodiments of the present invention, analysis of the API I/O data is performed by validation mod 370 to identify pre-defined issues.

Processing proceeds to step S275, where staleness mod 375 determines average staleness for specified fields. In this example, a pre-defined issue is staleness of specific fields within the API I/O. Average staleness values support comparison to user-specific staleness analysis.

Processing proceeds to step S280, where issues mod 380 identifies a set of issues associated with a first user. Each user of an API produces API I/O data for consumption by embodiments of the present invention. In this example, validation of API I/O with respect to the first user, for example user 104, and comparison of data entered by the first user with average staleness values are the basis for identifying the set of issues associated with the first user. In this example, the set of issues are recorded to metrics store 302. Alternatively, the set of issues is obtained by selecting issues from a list of target issues, the selected issues being associated with the first user by the validation process performed by issues mod 380.

Processing proceeds to step S285, where correlation mod 385 establishes a degree of correlation for the set of issues to usage reduction. In this example, the activity of users who have identified sets of issues as recorded in metrics store 302, including the first user (user 104), is monitored to identify a usage reduction. In that way, usage reduction may be correlated to identified issues associated with the particular users who exhibit usage reduction. Alternatively, when a user such as the first user is flagged for usage reduction, the correlation mod retrieves the set of issues associated with the specific user. When a predefined threshold number of flagged users are associated with a single issue or a combination of issues, the correlation mod establishes the single issue or combination of issues as having a relatively high degree of correlation to usage reduction. Further, the threshold value ranges may be established for low, medium, and high degrees of correlation to usage reduction. In that way, when a threshold value falls within the range of threshold values associated with medium degree of correlation, the correlation mod assigns the corresponding user as having a medium risk of attrition, or usage reduction.

Processing ends at step S290, where retention mod 390 takes a retention action when a threshold degree of correlation is established. In this example, the established degree of correlation to usage reduction may trigger a retention action when it exceeds a threshold degree of correlation. For example, a medium degree of correlation may not be sufficient to trigger the retention action, but a high degree of correlation may trigger the retention action. Alternatively, for each degree of correlation, low, medium, or high, there is an associated retention action. For example, a low degree of correlation may trigger a notification to the API owner of the likelihood that user attrition may increase. Some embodiments of the present invention also report the set of issues and/or the user identification on which the notification is based.

Retention actions may include, but are not limited to: (i) notification of the API owner; (ii) invitations to users to participate in training programs; (iii) target updates to the API; and/or (iv) identifying offers for the identified user(s) who may reduce usage. The identified offers may be determined by making an downstream call to an offers service.

Further embodiments of the present invention are discussed in the paragraphs that follow.

Some embodiments of the present invention focus on API gateways and on detecting the fact that an API is returning stale data.

According to some embodiments of the present invention, when an API response has some fields missing, it is found that the API response is "incomplete."

Some embodiments of the present invention do more than use very simple techniques that the number of API calls being made has dropped or that there are 400 to 500 errors arising each day.

Some embodiments of the present invention are directed to analyzing API input/output to measure and/or detect issues related to accuracy, staleness, completeness, and mutual consistency of the API-related data. Further, some embodiments of the present invention perform the analyzing by a process including the following steps: (i) identifying the data format and/or data types for the different fields in the API response in a pre-production environment; (ii) allowing users to define patterns and/or methods to validate the different fields in the API input/response; (iii) detecting issues in the API at runtime by using the discovered field types and the patterns and/or methods; (iv) determining a correlation between user attrition and the issues, or errors, identified in the analysis; and (v) issuing a warning to an API provider when there is a threshold level of correlation between the issues detected and user attrition. Alternatively, a warning is issued when the detected issues reach a threshold level indicating a risk of user attrition according to the determined correlation between user attrition and detected issues.

Some embodiments of the present invention are directed to identifying users who have stopped using certain APIs and determining if there is a strong correlation between the stopped users and the identified aspects of API function and data processing. Some embodiments of the present invention analyze the issues of staleness, completeness, accuracy, and consistency to determine how many stopped users have faced those issues. When a threshold percentage of stopped users have encountered at least one of the specified issues, a strong correlation is identified between the issues encountered and the user attrition. In that way, an early warning is provided so that the encountered issues can be fixed and user attrition can be better managed.

Some embodiments of the present invention are directed towards finding prior art that discloses a method and system for analyzing application programming interface (API) input/output and correlating it with the API usage to measure and detect different API usage issues such as accuracy, staleness, completeness, and mutual consistency.

Some embodiments of the present invention do more than provide analytics for API usage to identify delays, errors, and other activity information (use case patterns) based on identifying type of activity, wherein the use case patterns indicate when a user first adopted the new API and then subsequently stopped using the new API.

Some embodiments of the present invention do more than analyze API usage to identify a relationship between API input data and API output data of two or more API calls between an API consumer and a provider to generate a dependency indicating accuracy.

Some embodiments of the present invention utilize API input and output data to identify issues before the issues impact the API producers or before the issues lead to user attrition.

Some embodiments of the present invention operator according to analysis of the data processed by the API.

Some embodiments of the present invention may include one, or more, of the following features, characteristics and/or advantages: (i) provides for early detection of user attrition using analytics.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for correlating application programming interface (API) usage to issues in APIs, the method comprising:
    identifying field characteristics of API input/output (I/O) data generated during operation of an API;
    validating the I/O data based on a set of issue criteria;
    identifying a set of issues for a first user, the set of issues identified in the set of issue criteria;
    establishing a degree of correlation of an identified issue to API usage reduction; and
    responsive to the degree of correlation meeting a threshold degree of correlation, taking a retention action corresponding to the threshold degree.

2. The method of claim 1, further comprising:
    monitoring usage of the API by the first user;
    wherein:
    the identified issue is a combination of issues in the identified set of issues.

3. The method of claim 1, further comprising:
    determining an average staleness of a selected field of the API I/O data; and
    comparing the average staleness to a staleness value of the selected field for the first user;
    wherein:
    the identified issue is staleness.

4. The method of claim 1, wherein:
    the threshold degree of correlation is one threshold range of a plurality of threshold ranges; and
    the retention action corresponds to the threshold range in which the degree of correlation is found.

5. The method of claim 1, wherein the issue criteria include mutual field consistency and data completeness.

6. The method of claim 1, wherein the field characteristics include a number of digits of a first field and a pattern of digits and characters of a second field.

7. The method of claim 1, further comprising:
    collecting the API I/O data during operation of the API.

8. The method of claim 1, wherein the retention action is to identify from an offer service, a special offer to be directed to the first user.

9. A computer system for correlating application programming interface (API) usage to issues in APIs, the computer system comprising:
    a processor set; and
    a computer readable storage medium;
    wherein:
    the processor set is structured, located, connected, and/or programmed to run program instructions stored on the computer readable storage medium; and
    the program instructions which, when executed by the processor set, cause the processor set to perform a method comprising:
        identifying field characteristics of API input/output (I/O) data generated during operation of an API;
        validating the I/O data based on a set of issue criteria;
        identifying a set of issues for a first user, the set of issues identified in the set of issue criteria;
        establishing a degree of correlation of an identified issue to API usage reduction; and responsive to the degree of correlation meeting a threshold degree of correlation, taking a retention action corresponding to the threshold degree.

10. The computer system of claim 9, where the program instructions further cause the processor set to perform:
monitoring usage of the API by the first user;
wherein:
the identified issue is a combination of issues in the identified set of issues.

11. The computer system of claim 9, where the program instructions further cause the processor set to perform:
determining an average staleness of a selected field of the API I/O data; and
comparing the average staleness to a staleness value of the selected field for the first user;
wherein:
the identified issue is staleness.

12. The computer system of claim 9, wherein:
the threshold degree of correlation is one threshold range of a plurality of threshold ranges; and
the retention action corresponds to the threshold range in which the degree of correlation is found.

13. The computer system of claim 9, wherein the issue criteria include mutual field consistency and data completeness.

14. The computer system of claim 9, wherein the field characteristics include a number of digits of a first field and a pattern of digits and characters of a second field.

15. The computer system of claim 9, where the program instructions further cause the processor set to perform:
collecting the API I/O data during operation of the API.

16. A computer program product comprising a computer-readable storage medium having a set of instructions stored therein which, when executed by a processor, causes the processor to perform a method comprising:
identifying field characteristics of application programming interface (API) input/output (I/O) data generated during operation of an API;
validating the I/O data based on a set of issue criteria;
identifying a set of issues for a first user, the set of issues identified in the set of issue criteria;
establishing a degree of correlation of an identified issue to API usage reduction; and
responsive to the degree of correlation meeting a threshold degree of correlation, taking a retention action corresponding to the threshold degree.

17. The computer program product of claim 16, wherein the set of instructions further cause the processor to perform:
monitoring usage of the API by the first user;
wherein:
the identified issue is a combination of issues in the identified set of issues.

18. The computer program product of claim 16, wherein the set of instructions further cause the processor to perform:
determining an average staleness of a selected field of the API I/O data; and
comparing the average staleness to a staleness value of the selected field for the first user;
wherein:
the identified issue is staleness.

19. The computer program product of claim 16, wherein:
the threshold degree of correlation is one threshold range of a plurality of threshold ranges; and
the retention action corresponds to the threshold range in which the degree of correlation is found.

20. The computer program product of claim 16, wherein the issue criteria include mutual field consistency and data completeness.

* * * * *